United States Patent [19]

Brownfield

[11] 3,871,692

[45] Mar. 18, 1975

[54] KT CONDUIT WITH COMPANION COUPLING

[76] Inventor: Russell B. Brownfield, 6126 S. Langley Ave., Chicago, Ill. 60637

[22] Filed: Feb. 19, 1974

[21] Appl. No.: 443,466

[52] U.S. Cl. .................................. 285/390, 285/417
[51] Int. Cl. ............................................. F16l 15/00
[58] Field of Search ............ 285/32, 355, 390, 417, 285/31, 23, 327

[56] References Cited
UNITED STATES PATENTS

| 720,578 | 2/1903 | Greenfield | 285/417 X |
| 1,270,021 | 6/1918 | Delehanty | 285/32 |
| 1,812,794 | 6/1931 | Lally | 285/390 X |
| 1,935,041 | 11/1933 | Armacost | 285/390 X |
| 2,125,380 | 8/1938 | Krueger | 285/32 X |
| 2,297,966 | 10/1942 | Luff | 285/32 |

Primary Examiner—Dave W. Arola
Attorney, Agent, or Firm—Mann, Brown, McWilliams & Bradway

[57] ABSTRACT

An electrical conduit with a companion coupling that eliminates the necessity for turning or threading either of the aligned conduit sections into the coupling which includes a coupling member having nontapered internal threads and conduit sections in end opposed relation each having nontapered threaded end portions with a nonthreaded area immediately behind the threaded portions on at least one conduit section of less diameter than the outside dimension of the conduit sections and substantially the same as the smallest diameter of the threaded portions and wherein the length of the coupling is of substantially the same dimension as a threaded portion and a nonthreaded area on the one conduit section.

2 Claims, 4 Drawing Figures

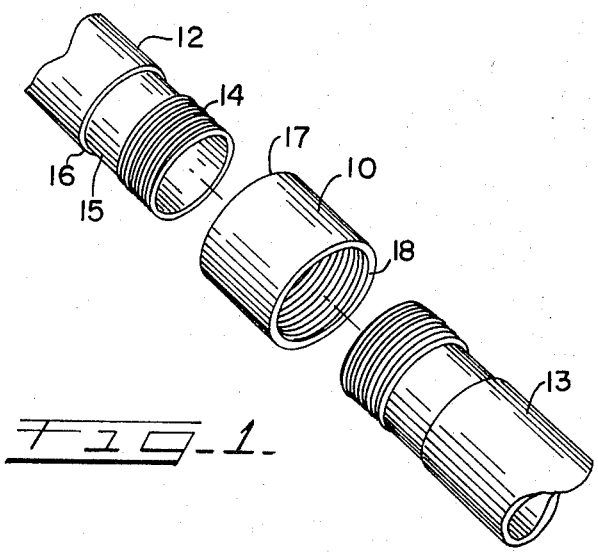
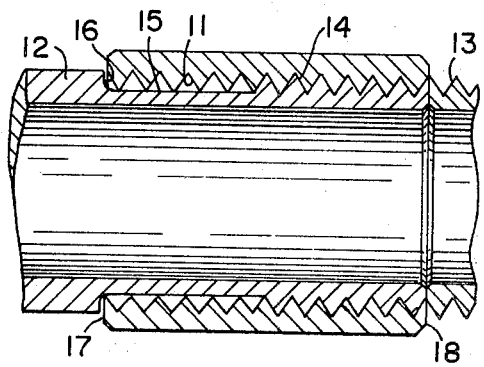
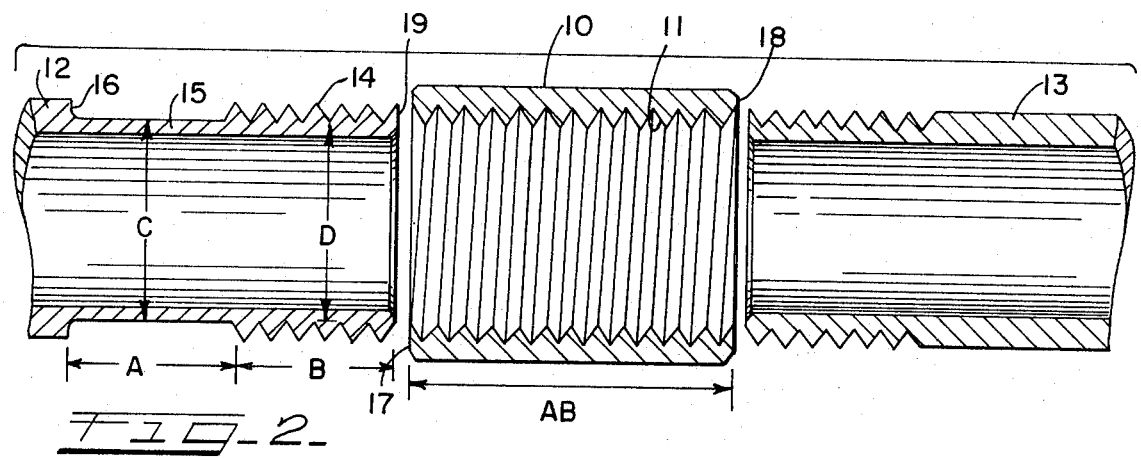
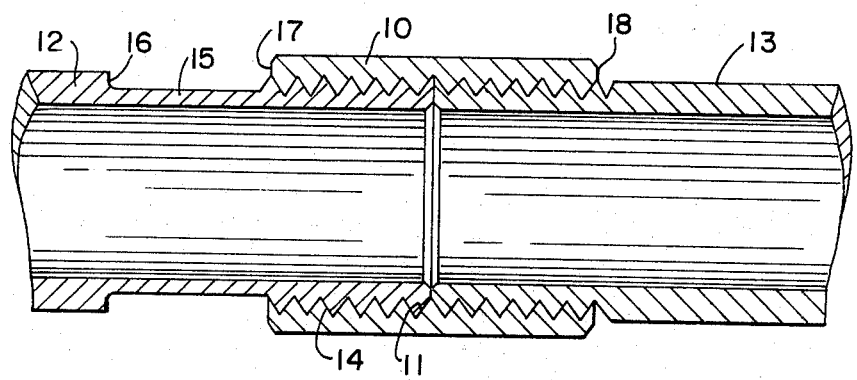

KT CONDUIT WITH COMPANION COUPLING

BACKGROUND OF THE INVENTION

Heretofore, in the art relating to electrical conduit structures and their assembly, it has been the practice to provide couplings for adjoining conduit sections and which were of various, more or less standardized types, including nonthreaded coupling members secured by set screws to adjoining sections, or couplings disposed between aligned conduit sections which are secured thereto by locknuts, or compression nuts, or combination couplings which combined the features of both such types of couplings and where the type of conduit used permitted, couplings were utilized that could be secured to adjoining conduit sections by indenting the coupling and the respective sections. This latter type of coupling of course represented a permanent type of connection and obtained its connection between the parts by damage to the several parts to the extent necessitated by the indentation of the connected elements. Connections made between aligned conduit sections by means of couplings utilizing compression fittings or locknuts necessitated the spacing of the conduit sections apart for the insertion of the coupling therebetween and consequently the sections secured in this manner could not be placed in end abutting relationship. Where the connection of adjoining conduit sections was made by means of the set screw type of coupling the sections not only were subjected to possible damage by the set screws, but it was necessary to slide the coupling into one section and tighten the set screw and then slide the other conduit section into the coupling and tighten the set screw. This meant that additional space was required for the assembly operation obtained in the manner described.

One type of prior coupling utilized an internally threaded coupling member in association with conduit sections having threaded end portions but in this arrangement it was necessary to thread the coupling member onto one of the sections and tighten it and then the other section was threaded into the coupling and tightened. All of the threads utilized on the several members were of the tapered type which had the effect of fixing the relative positioning of the connected parts and again this arrangement required additional space for assembling the parts in this manner and, when assembled, the aligned conduit sections normally could not be placed in end abutting relationship.

SUMMARY OF THE INVENTION

The present invention provides an internally threaded companion coupling member for rigid conduit but the threads in the coupling are of the nontapered type and are of the same diameter entirely through the coupling. The coupling member is designed for association with conduit sections which may be disposed in aligned end abutting relationship. The conduit sections have externally threaded end portions which are also of the nontapered type for complemental threaded engagement with the coupling member. Behind the threaded portion, the conduit section is provided with an area of reduced section relative to the outside diameter of the conduit section. This area is of substantially similar diameter to the smallest diameter of the threaded end portion and is not threaded. The length of this area, taken with the length of the threaded end portion, represents a combined length that is substantially equal to the length of the coupling member. The proportions of the threaded end portion and the unthreaded area of reduced diameter is such that the coupling member can be threaded onto a conduit section and turned onto the section to the point where it overlies the unthreaded area with the rear edge of the coupling in engagement with the shoulder formed at the juncture of the reduced diameter area of the conduit section and the full diameter section of the conduit. With the rear edge of the coupling member in engagement with the shoulder, the opposite or front edge of the coupling member is disposed substantially flush with the end of the conduit section. Another conduit section can now be aligned with the first section and placed in end abutting relationship therewith and the coupling member then threaded onto the threaded end portion of the second section to secure the two sections together. With this arrangement it is possible to align and assemble the conduit sections in end-to-end relationship without the necessity for providing additional space for the assembly operation and without requiring either of the conduit sections to be rotated or turned into the threads of the coupling member. The conduit sections can be assembled with a coupling member threaded fully onto one end thereof so that it is disposed flush with the end of the section. In this way it becomes necessary merely to place the conduit sections in aligned end abutting relation and turn the coupling member onto each new section as it is added to the assembly, whereby a full length of conduit, comprised of several conduit sections, can be assembled most expeditiously and without requiring any additional space to allow for the operation of connecting the sections together.

OBJECTS OF THE INVENTION

The invention relates primarily to an arrangement for assembling electrical conduit sections together in a threaded companion coupling without the necessity for turning or rotating the conduit sections.

The principal object of the invention is the provision of an internally threaded companion coupling member having nontapered threads for combination with conduit sections having threaded end portions containing nontapering threads and at least one section having a nonthreaded area adjacent to the threaded portion for receiving the coupling member prior to connection with an associated conduit section.

An important object of the invention is to provide an electrical conduit and companion coupling arrangement including an internally threaded coupling member and conduit sections having externally threaded end portions with means adjacent to the end portion on at least one section to receive the coupling member in an uncoupled position.

Another object of the invention is the provision of an electrical conduit and companion coupling arrangement including an internally threaded coupling member and conduit sections having threaded end portions with an unthreaded area behind the end portion of at least one section of reduced diameter relative to the outside diameter of the conduit sections.

A further object of the invention is to provide a conduit and companion coupling arrangement including an internally threaded coupling member for association with end abutting conduit sections having threaded end portions and an unthreaded area behind the threaded portion of at least one section of substantially the same diameter as the smallest diameter of the threaded end portion.

A still further object of the invention is the provision of a conduit and companion coupling arrangement including an internally threaded coupling member for association with aligned conduit sections having threaded end portions and an unthreaded area behind the threaded portion of at least one of the sections with the combined length of the threaded portion and unthreaded area being substantially equal to the length of the coupling.

DESCRIPTION OF THE DRAWINGS

The foregoing and other and more specific objects of the invention are attained by the structure and arrangement illustrated in the accompanying drawings wherein:

FIG. 1 is a general perspective view of the conduit and companion coupling member showing two conduit sections incorporating the improved features of this invention and the coupling member in exploded relationship;

FIG. 2 is a sectional view lengthwise of the conduit section of this invention and companion coupling member and a conduit section having a threaded end with the parts separated;

FIG. 3 is a lengthwise sectional view through the conduit sections and companion coupling of FIG. 2 with the coupling member threaded fully onto the one conduit section of this invention and the second conduit section having a threaded end in end-abutting relation to the first section ready to be connected; and FIG. 4 is a lengthwise sectional view through the conduit sections and companion coupling member with the parts fully connected showing the threaded end portions of the conduit sections completely covered by the coupling member.

DESCRIPTION OF PREFERRED EMBODIMENT

In the drawings 10 represents a coupling member having internal threads 11 extending continuously therethrough and it is important to note that these threads are nontapered and are of the same pitch and diameter throughout the full length of the coupling. The coupling member 10 is adapted to be operatively associated with and function as a companion member to conduit sections 12 and 13. Each of these conduit sections is formed with a threaded end portion 14 and one or both sections may be formed with a nonthreaded area 15. The length A of the nonthreaded area 15 on the conduit is substantially equal to the length B of the threaded end portion 14 and it will be noted that the length AB of the coupling member 10 is substantially equal to the combined lengths of the nonthreaded area 15 and threaded end portion 14. A shoulder 16 is formed on the conduit sections 12 where the nonthreaded area 15 joins the outside diameter of the conduit.

The outside diameter of the nonthreaded area 15 is substantially the same as the smallest diameter D of the threaded end portion 14 and it will be seen that with the nontapered threads on all of the parts this enables the internally threaded coupling member 10 to be threaded fully onto a conduit section 12 with the threads 11 disposed for approximately one-half of the length of the coupling, in threaded engagement with the threads 14 and the other half of the threads are received in the nonthreaded area 15. In this uncoupled position the rear end 17 of the companion coupling member occupies a position adjacent the shoulder 16 which thereby acts as a limit stop to further inward movement of the coupling member and the front end 18 of the coupling member is disposed substantially flush with the end face 19 of the conduit section.

It will be seen that with the companion coupling member 10 threaded fully onto the conduit section 12, as described, the conduit section 13 can readily be placed directly into end abutting relationship with the section 12 without requiring an additional lengthwise space for the assembly operation. Under restricted space conditions this enables the second conduit section to be placed in alignment with the first section and the coupling member threaded from the first section onto the second section to engage both sections and secure the connection.

It is of course understood that this same type of connection can be made with the companion coupling member 10 threaded fully onto the second conduit section and then when the second conduit section is brought into alignment with the first conduit section the coupling member can be threaded from the second section onto the first section to engage the threads of both sections and thus secure the connection in the same manner.

It should be noted that when the companion coupling member is disposed in operative engagement with the threaded end portions 14 of adjoining conduit sections 12 and 13, the coupling has substantially equal engagement with each section, with each threaded end portion occupying substantially one-half of the length of the coupling member and the threads 14 on both of the adjoining conduit sections are completely covered by the coupling member and do not show when the coupling between such conduit sections is properly made. This enables the installer to determine quickly when a secure connection has been obtained.

In practice the conduit sections can be assembled with a companion coupling member 10 threaded fully onto one end of each section so that it then becomes possible to supply the preassembled conduit sections and companion coupling to an erection site where the sections can then be readily installed one after another in the most expeditious manner and without the loss of any time, thus reducing the man hours required for complete installation.

The threads 11 in the coupling member 10 and the threads 14 on the conduit sections 12 and 13 can be formed in the usual way in the normal manufacture of the conduit sections and the companion coupling and the nonthreaded area 15 can be formed on the conduit sections by any one of several methods, as preferred, but it is contemplated that this operation might be performed in the manufacture of the conduit sections together with the threading operation.

It can readily be appreciated that the conduit sections 12 and 13 can be completely assembled in any installation regardless of the size or extent of the installation without the necessity for rotating any conduit section or turning any of the sections into any of the companion coupling members utilized to obtain the connections between adjoining conduit sections. The only part that is rotated, or turned, to obtain the threaded connections, comprises the coupling member 10 which is always threaded first onto one conduit section and then is threaded onto an adjoining conduit section when the second conduit section is brought into end abutting aligned relationship with the first section. Thus, any first established connection between conduit sections is not disturbed because it is not necessary to rotate subsequently installed sections. This is of importance in the installation of electrical conduit utilizing threaded connections for assembly.

It is important to note also that the nonthreaded area 15 may be incorporated on only one end of each conduit section 12 or 13, and the opposite end of such conduit section provided both with a threaded portion 14 and a nonthreaded area 15. This type of arrangement is indicated most clearly in FIGS. 2 and 4 where the conduit section 13 is indicated as having a threaded end portion 14 on the end disposed for cooperation with the companion coupling member 10. The opposite end of this conduit section is provided both with a threaded end portion and an adjacent nonthreaded area. The conduit section 12 in these figures is shown as having both a threaded end portion 14 and a nonthreaded area 15 immediately adjacent thereto. This end of the conduit section 12 as shown is disposed for cooperation with the companion coupling 10 but the opposite end of this section is provided only with a threaded end portion.

However, as most clearly shown in FIG. 1, both of the adjoining ends of conduit sections 12 and 13 disposed for cooperation with the companion coupling member 10 may be formed with both a threaded end portion 14 and a nonthreaded area 15 immediately behind the threaded portion. With either of these arrangements the invention is equally effective since it is possible to thread the companion coupling member fully onto one conduit section, bring the adjoining ends of two sections into end abutting relationship, without requiring additional lengthwise space, and then thread the coupling member onto the threaded ends in a manner to effect the connection without the necessity for rotating either of the conduit sections.

What is claimed is:

1. A conduit and companion coupling arrangement for rigid electrical conduit comprising a coupling member having internal threads extending continuously therethrough, and a pair of conduit sections in end-to-end abutting relationship each having a threaded end portion, said coupling member being threaded fully onto one of said conduit sections in an uncoupled position and threaded substantially equally onto both of said conduit sections in a coupled position, said threaded end portions on the conduit sections comprising non-tapered threads and said internal threads in said coupling member being non-tapered, at least one of said conduit sections having a nonthreaded area behind the respective threaded end portions, said nonthreaded area being of less diameter than the outside diameter of said conduit sections and substantially the same as the smallest diameter of said threaded end portions, said nonthreaded area of less diameter providing space for receiving said coupling member in the uncoupled position, and an annular shoulder at the inner end of said nonthreaded area where the area of less diameter joins the outside diameter of such conduit section to act as a limit stop to inward movement of the coupling member, the combined lengths of said threaded end portion and said nonthreaded area on one of said conduit sections being substantially equal to the length of said coupling member and said coupling member in the uncoupled position engages said shoulder at one end of the coupling member and the opposite end thereof is disposed substantially flush with the end of said conduit section.

2. A conduit and companion coupling arrangement as set forth in claim 1 wherein said conduit sections each have a nonthreaded area behind the respective threaded end portions.

* * * * *